USO10620982B2

(12) United States Patent
Avila et al.

(10) Patent No.: US 10,620,982 B2
(45) Date of Patent: Apr. 14, 2020

(54) MULTI-TARGET DEPLOYMENT OF VIRTUAL SYSTEMS

(71) Applicant: International Business Machines Corporation, Armonk, NY (US)

(72) Inventors: David Avila, Austin, TX (US); Terry M. Bleizeffer, Durham, NC (US); Thuy T. Duong, Seattle, WA (US); Stephanie K. Hagadorn, Austin, TX (US); Hugh E. Hockett, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 129 days.

(21) Appl. No.: 14/615,457

(22) Filed: Feb. 6, 2015

(65) Prior Publication Data
US 2016/0232018 A1 Aug. 11, 2016

(51) Int. Cl.
G06F 9/455 (2018.01)
G06F 9/50 (2006.01)
(52) U.S. Cl.
CPC ........... G06F 9/45558 (2013.01); G06F 9/50 (2013.01); G06F 2009/45562 (2013.01)
(58) Field of Classification Search
None
See application file for complete search history.

(56) References Cited

U.S. PATENT DOCUMENTS 8,238,256 B2   8/2012  Nugent
8,417,578 B1   4/2013  Evans
(Continued)

FOREIGN PATENT DOCUMENTS

WO   WO-2014088543 A1 * 6/2014 ........... G06F 9/5072

OTHER PUBLICATIONS

IBM et al, "IBM PureApplication Software V2.0 delivers enhancements for mission-critical production environments with improvements for continuous availability, diaster recovery and serviceability", Jul. 29, 2014, IBM United States Software Announcement 214-335, "Grace Period Disclosure", <http://www-01.ibm.com/common/ssi/ShowDoc.wss?docURL=/common/ssi/rep_ca/5/897/ENUS214-335/index.html&request_locale=en>.
(Continued)

Primary Examiner — Lewis A Bullock, Jr.
Assistant Examiner — Bruce S Ashley
(74) Attorney, Agent, or Firm — James H. Mayfield; William H. Hartwell

(57) ABSTRACT

A method, executed by a computer, for deploying a virtual system includes collecting requirements for a computing system from a user, determining a component pattern corresponding to the user requirements, enabling a user to edit the component pattern, presenting the component pattern on a deployment design grid, and deploying a virtual system corresponding to the component pattern. The component pattern may correspond to one or more components and associated attributes, as well as a distribution for the components. In one embodiment, enabling a user to edit the component pattern includes reserving system resources for the components such that the system resources are available to the components at runtime. A computer system and computer program product corresponding to the method are also disclosed herein.

18 Claims, 8 Drawing Sheets

(56) References Cited

U.S. PATENT DOCUMENTS

| | | | | |
|---|---|---|---|---|
| 2005/0005261 A1* | 1/2005 | Severin | ................... | G06F 8/316 |
| | | | | 717/108 |
| 2012/0254443 A1* | 10/2012 | Ueda | ................... | H04L 67/1008 |
| | | | | 709/226 |
| 2013/0212576 A1 | 8/2013 | Huang et al. | | |
| 2013/0254755 A1* | 9/2013 | Yousouf | ................... | G06F 8/60 |
| | | | | 717/170 |
| 2013/0297922 A1* | 11/2013 | Friedman | ................... | G06F 8/63 |
| | | | | 713/2 |
| 2013/0318527 A1* | 11/2013 | Tamura | ................ | G06F 9/5072 |
| | | | | 718/1 |
| 2014/0282536 A1* | 9/2014 | Dave | ................. | G06Q 30/0631 |
| | | | | 718/1 |

OTHER PUBLICATIONS

McChesney et al., "Manage the topology with Virtual system patterns", Apr. 11, 2012, pp. 1-15, © Copyright IBM Corporation 2012.

* cited by examiner

MULTI-TARGET DEPLOYMENT OF VIRTUAL SYSTEMS

STATEMENT REGARDING PRIOR DISCLOSURES BY THE INVENTOR OR A JOINT INVENTOR

The following disclosure(s) are submitted under 35 U.S.C. 102(b)(1)(A) as prior disclosures by, or on behalf of, a sole inventor of the present application or a joint inventor of the present application:
(1) IBM PureApplication Software V2.0 delivers enhancements for mission-critical production environments with improvements for continuous availability, disaster recovery, and serviceability.

BACKGROUND OF THE INVENTION

The present invention relates generally to system virtualization, and more specifically to the field of multi-target deployment for virtual systems. A virtual system is a grouping of virtual machines that work together to accomplish one or more desired tasks. Often, it is desirable to deploy a virtual system to multiple servers or "targets."

SUMMARY

As disclosed herein, a method, executed by a computer, for deploying a virtual system, includes collecting requirements for a computing system from a user, determining a component pattern corresponding to the user requirements, enabling a user to edit the component pattern, presenting the component pattern on a deployment design grid, and deploying a virtual system corresponding to the component pattern. The component pattern may correspond to one or more components and associated attributes, as well as a distribution for the components. In one embodiment, enabling a user to edit the component pattern includes reserving system resources for the components such that the system resources are available to the components at runtime. A computer system and computer program product corresponding to the method are also disclosed herein.

DETAILED DESCRIPTION

It should be noted that references throughout this specification to features, advantages, or similar language herein do not imply that all of the features and advantages that may be realized with the embodiments disclosed herein should be, or are in, any single embodiment of the invention. Rather, language referring to the features and advantages is understood to mean that a specific feature, advantage, or characteristic described in connection with an embodiment is included in at least one embodiment of the present invention. Thus, discussion of the features, advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages will become more fully apparent from the following drawings, description and appended claims, or may be learned by the practice of the invention as set forth hereinafter.

The embodiments disclosed herein enable editing and deployment of a virtual system, comprising one or more components. The components may be presented to the user as a component pattern on a deployment design grid.

A virtual system is a grouping of one or more individual components, each of which may exist as one or more instances. An instance is a specific realization of a component at runtime. A component pattern is a representation of a virtual system that may be pre-defined (e.g. a template), user-defined, or a combination thereof. Components of the virtual system may also by grouped into cloud groups at runtime, where cloud groups are virtual machines supplied with processing and memory resources via on one or more servers. The various components of the virtual system may communicate with other virtual systems or components in other virtual systems, or combinations thereof. A component belonging to one virtual system may, for instance, be packaged to run on a virtual system deployable on a first computing system and may reference a second component packaged to run on a second virtual system deployable on a second computing system different from the first.

Figure 1:
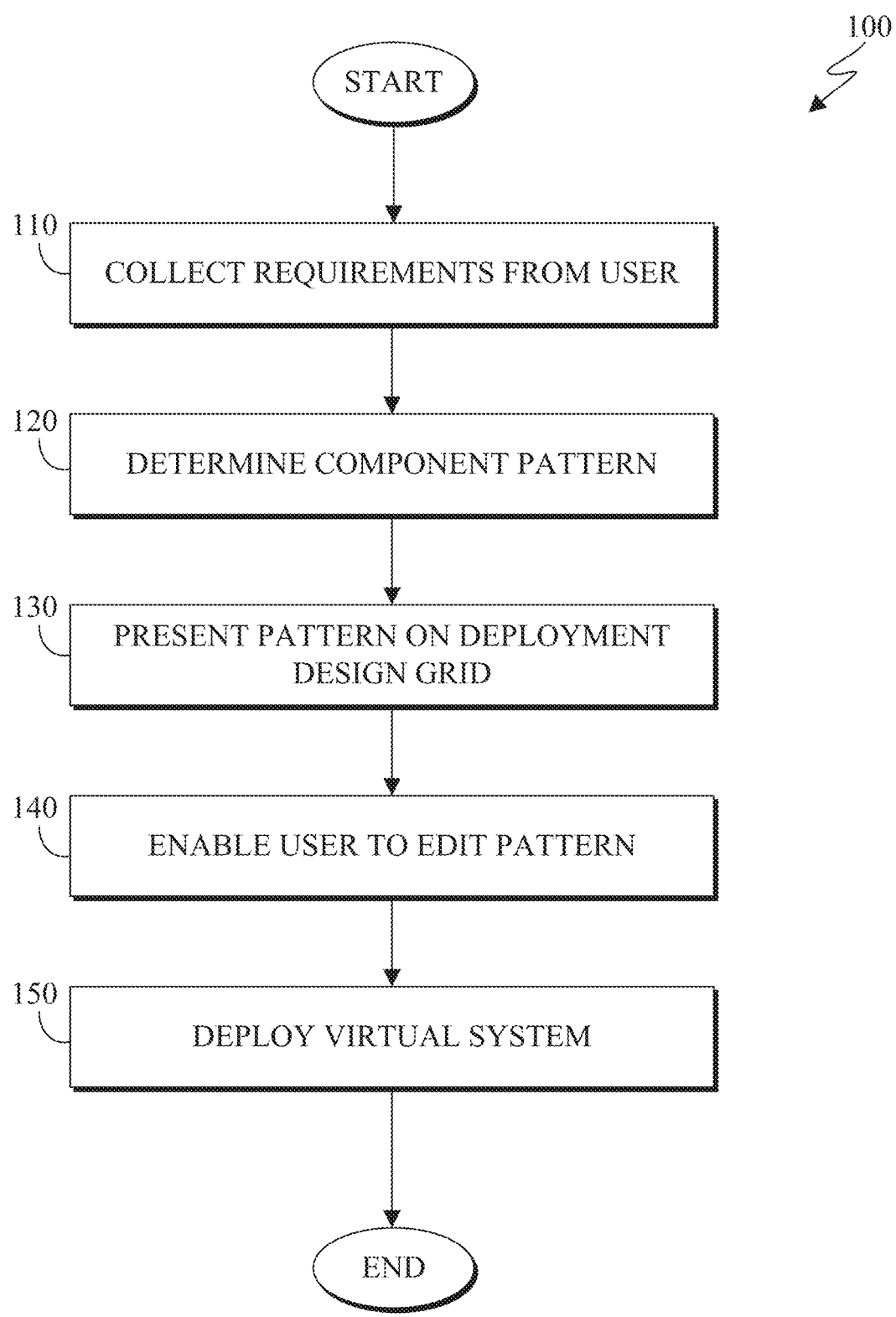
FIG. 1 is a flowchart of one embodiment of a virtual system deployment method in accordance with the present invention.

For example, FIG. 1 is a flowchart of one embodiment of a virtual system deployment method 100 in accordance with the present invention. As depicted, the virtual system deployment method 100 includes collecting (110) requirements from a user, determining (120) a component pattern, presenting (130) the component pattern on a deployment design grid, enabling (140) a user to edit the component pattern, and deploying (150) a virtual system corresponding to the component pattern. The virtual system deployment method 100 enables a user to design or modify a component pattern to arrive at a desired configuration for the virtual system, and then deploy the virtual system.

Collecting (110) requirements from a user may include receiving input regarding the type, function, and scale of the virtual system by specifying particular settings. The requirements will vary depending on the desired application(s) and performance of the virtual system. For example, the requirements for a virtual system may be collected by specifying one or more component attributes corresponding to the various components. Alternatively, some or all of the requirements may have default settings that facilitate the completion of the requirements collection operation 110 in the case of an absence or lack of user input.

Determining (120) a component pattern may include receiving information regarding the current availability and allocation of system resources (including memory, storage, and/or processing capacities) and suggesting one or more component patterns which, in runtime, will enable the virtual system to perform correctly within available system resources.

Presenting (130) the pattern on a deployment design grid may include displaying one or more of the suggested component patterns from the component pattern determination operation 120. The deployment design grid may provide a visual representation of the component pattern and available computing resources. In one embodiment, the design grid facilitates further design of the virtual system. During this operation and other operations of the method 100, computing resources may also be reserved on the server(s) on which the virtual system may be deployed so as to ensure that the virtual system is allocated sufficient resources upon deployment.

Enabling (140) a user to edit the component pattern may include modifying the placement and/or attributes of components that were selected during the requirements collection operation 110 or determining operation 120. To facilitate customization of the virtual system deployment, a user may move the components (e.g. by a drag-and-drop operation) into the various cells of the deployment design grid. In some embodiments, the user may select a component and modify the instance count of the component. In this manner, multiple instances of the same component may execute simultaneously at runtime.

Deploying (150) a virtual system corresponding to the component pattern may include installing and/or activating the components on one or more servers such that the components form a virtual system corresponding to the component pattern. In conjunction with the deploying operation 150, the computing resources that were reserved for the virtual system during previous operations may be allocated to the components such that the components may execute properly at runtime.

Figure 2:
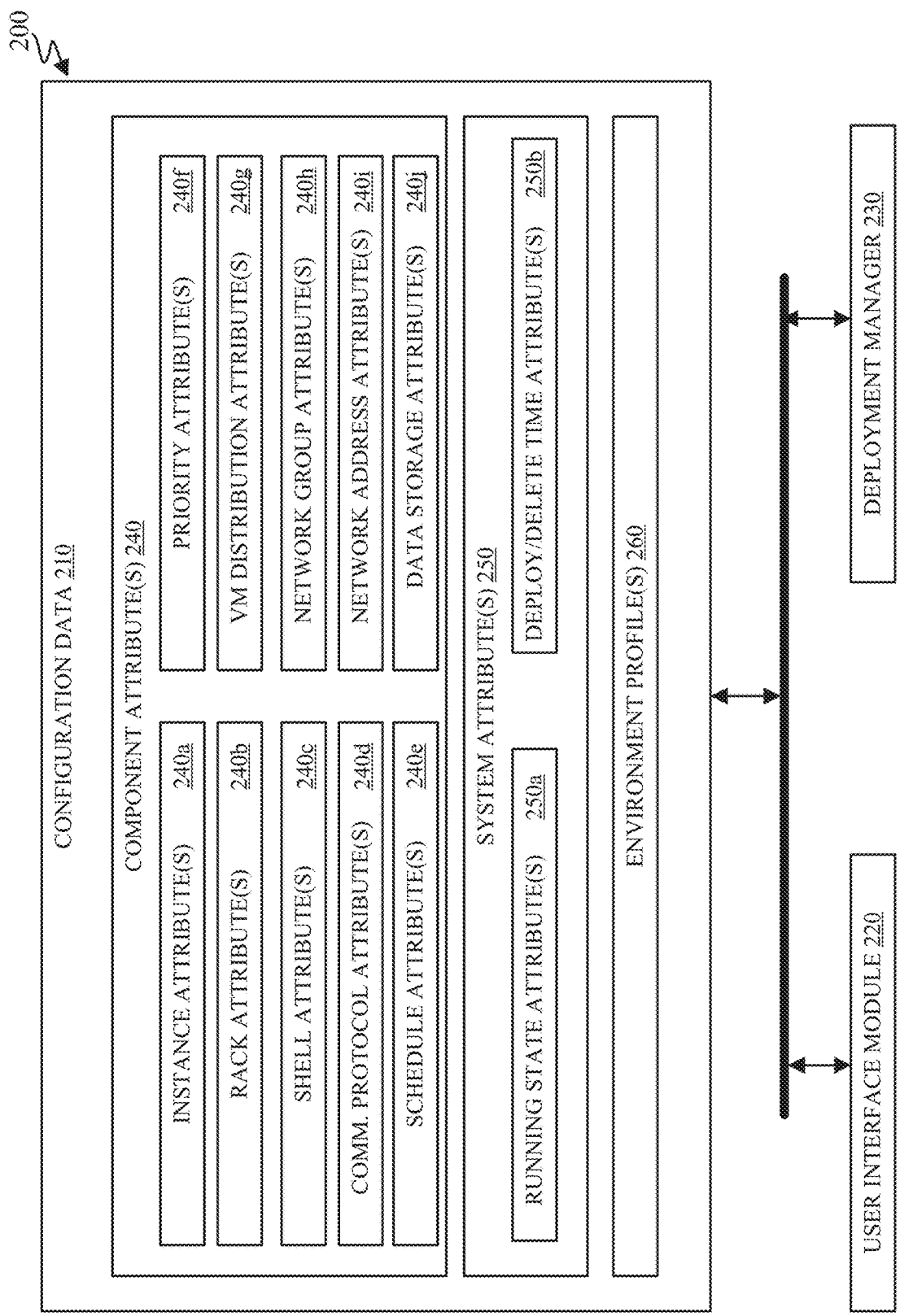
FIG. 2 is a block diagram of one embodiment of a deployment apparatus in accordance with the present invention.

FIG. 2 is a block diagram of one embodiment of a deployment apparatus 200 in accordance with one embodiment of the present invention. As depicted, the deployment apparatus 200 includes configuration data 210, a user interface module 220, and a deployment manager 230. The user interface module 220 enables a user to configure the configuration data 210 and then deploy a corresponding virtual machine via the deployment manager 230.

Configuration data 210 may include one or more component attributes 240, one or more system attributes 250, and one or more environment profiles 260. The particular settings of the configuration data 210 define the characteristics of the virtual system to be deployed.

The component attributes 240 may be used to specify component behavior. For example, the instance attribute(s) 240a may define the number of instances of a component. The instance attribute(s) 240a may also define a range of acceptable numbers of instances; the particular number of instances of a component may increment or decrement throughout this numerical range of instances upon the occurrence or nonoccurrence of predefined conditions or events.

In some embodiments, one or more rack attribute(s) 240b enable a user to describe one or more racks upon which the components will be executed at runtime. For example, components of a virtual system may be distributed across multiple racks; these racks may be adjacent to each other or spread across several rooms, buildings, or cities. One or more shell attribute(s) 240c may specify the type of shell that is used for a component, e.g. SSH and MOSH. One or more communications protocol attribute(s) 240d may specify the type of communication protocol(s) for a component, e.g. IPv4 and IPv6. One or more schedule attribute(s) 240e may enable a user to specify a predefined time schedule according to which a component executes.

One or more priority attribute(s) 240f may enable a user to specify a runtime priority for a component as compared to the priority other components, virtual machines, or virtual systems competing for the same computational resources. One or more virtual machine (VM) distribution attribute(s) 240g may enable a user to specify how the several components are distributed in and across racks during runtime. One or more network address attribute(s) 240 h may define the label (e.g. IP address) assigned to each component; similarly, one or more network group attribute(s) 240i may define a group of components (e.g. IP group) grouped together by network address. The data storage attribute(s) 240j may define a data volume (e.g. megabytes of storage), volume type (e.g. NTFS, FAT), and volume location (e.g. bus number) available to a virtual system.

The system attribute(s) 250 specify global settings for the virtual system. For example, the running state attribute(s) 250a specify details regarding the running state, which may be "start," "stopped," "maintenance," or the like. The deploy/deletion time attribute(s) 250b may specify at which time the pattern is to be deployed as well as the duration that the virtual system may run until a scheduled termination.

The environment profile(s) 260 designates available resources to which a virtual system can be deployed. For example, a first environment profile 260 may intermediate the deployment of components to one or more cloud groups and assign each of the components IP addresses from one or more IP groups. In this example, a second environment profile 260 enables deploying components to a different set of cloud groups and IP groups.

The user interface module 220 provides to a user editing access to the component pattern. For example, the user interface module 220 may translate the configuration data 210 into a visual representation that is comprehensible to the user. The deployment manager 230 may deploy a virtual system corresponding to the component pattern and associated configuration data 210 onto selected sets of servers or cloud groups. Deployment occurs during the deployment operation 150, and in one embodiment involves the execution of component instances on their corresponding cloud groups at runtime.

Figure 3A:
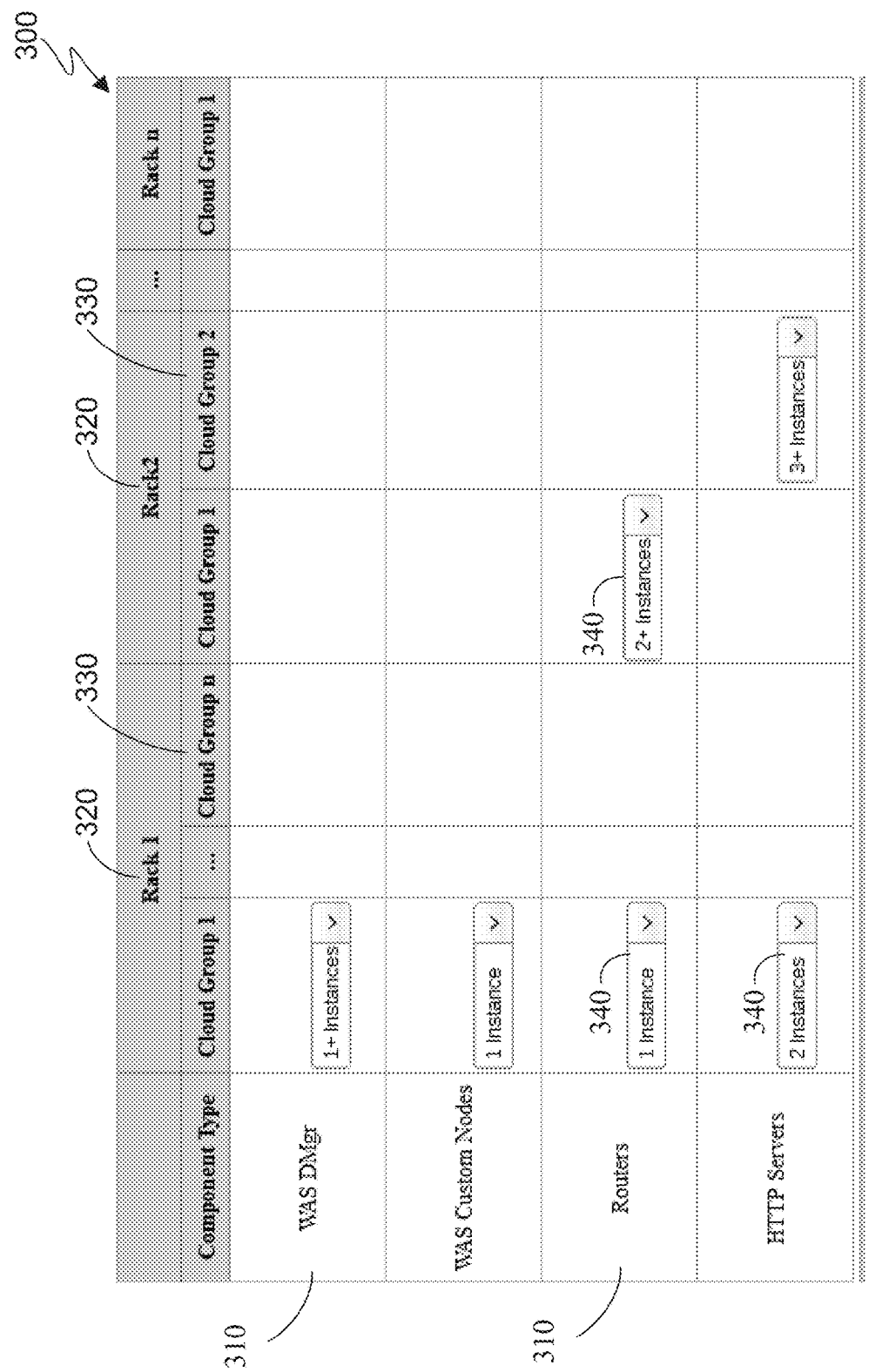
FIGS. 3A-3D are user interface diagrams depicting one example of a deployment design grid in accordance with the present invention.

FIGS. 3A-3D are user interface diagrams depicting selected features of a deployment design grid 300 in accordance with one embodiment of the present invention. FIG. 3A depicts an example of a component pattern that is edited on the deployment design grid 300. In the depicted embodiment, each component 310 occupies a row of the deployment design grid 300, and each cloud group 330 corresponds to a column of the deployment design grid 300. Alternatively, individual servers could correspond to columns of the deployment design grid 300. Each rack 320 may host one or more cloud groups 330. Each component 310 may be associated with a number of instances 340 of that component; for example, "2 instances" indicates that there are two instances 340 of a given component 310 occupying that cloud group 330 and rack 320. As another example, "3+ instances" indicates that there are currently three instances 340 of that component 310, but the number of instances 340 can scale (i.e. increment or decrement) depending on the settings and conditions laid out in the configuration data 210. Thus, the number of instance 340 is dynamically scalable.

Figure 3B:
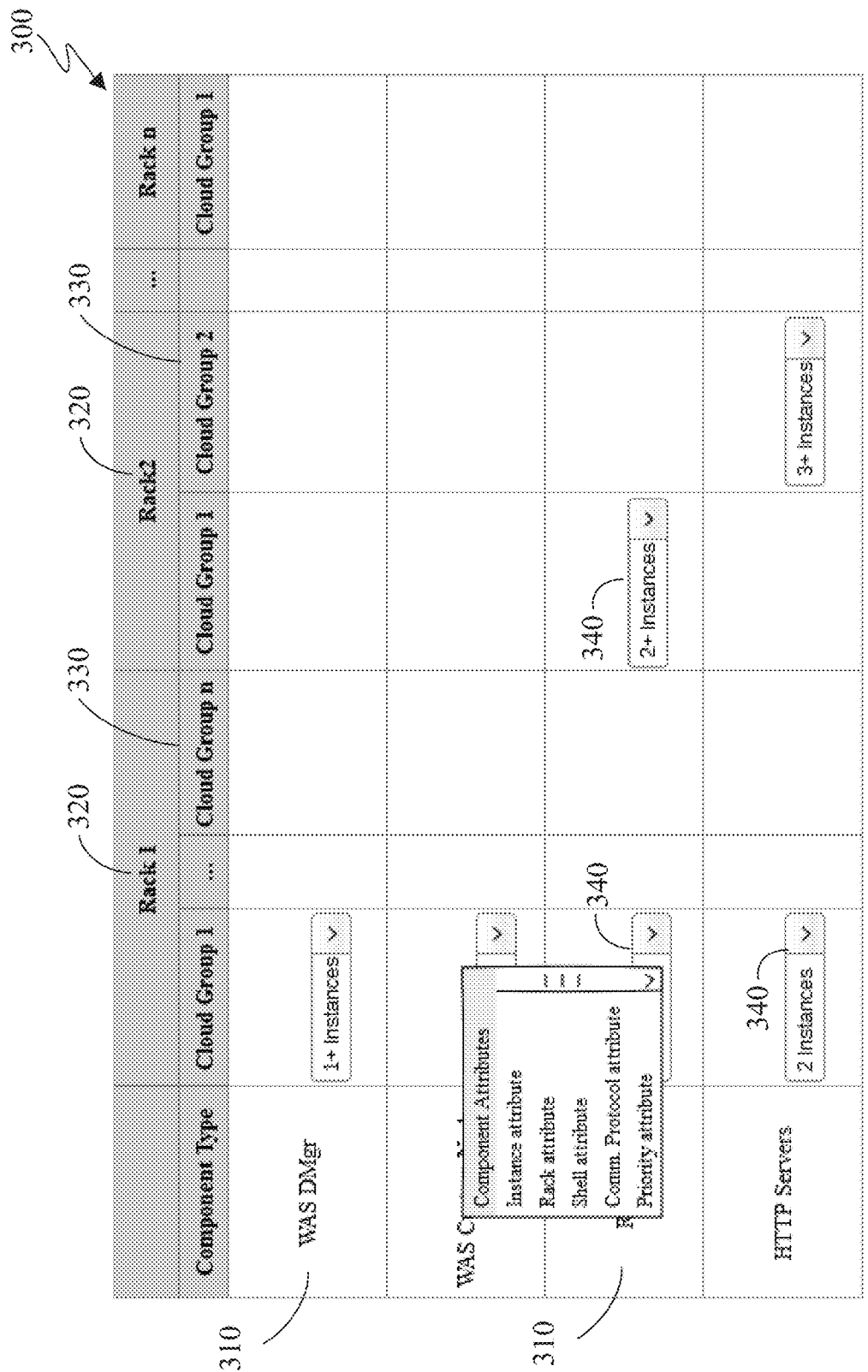

FIG. 3B depicts how the deployment design grid 300 may be used by a user to specify various component attributes

Figure 3C:
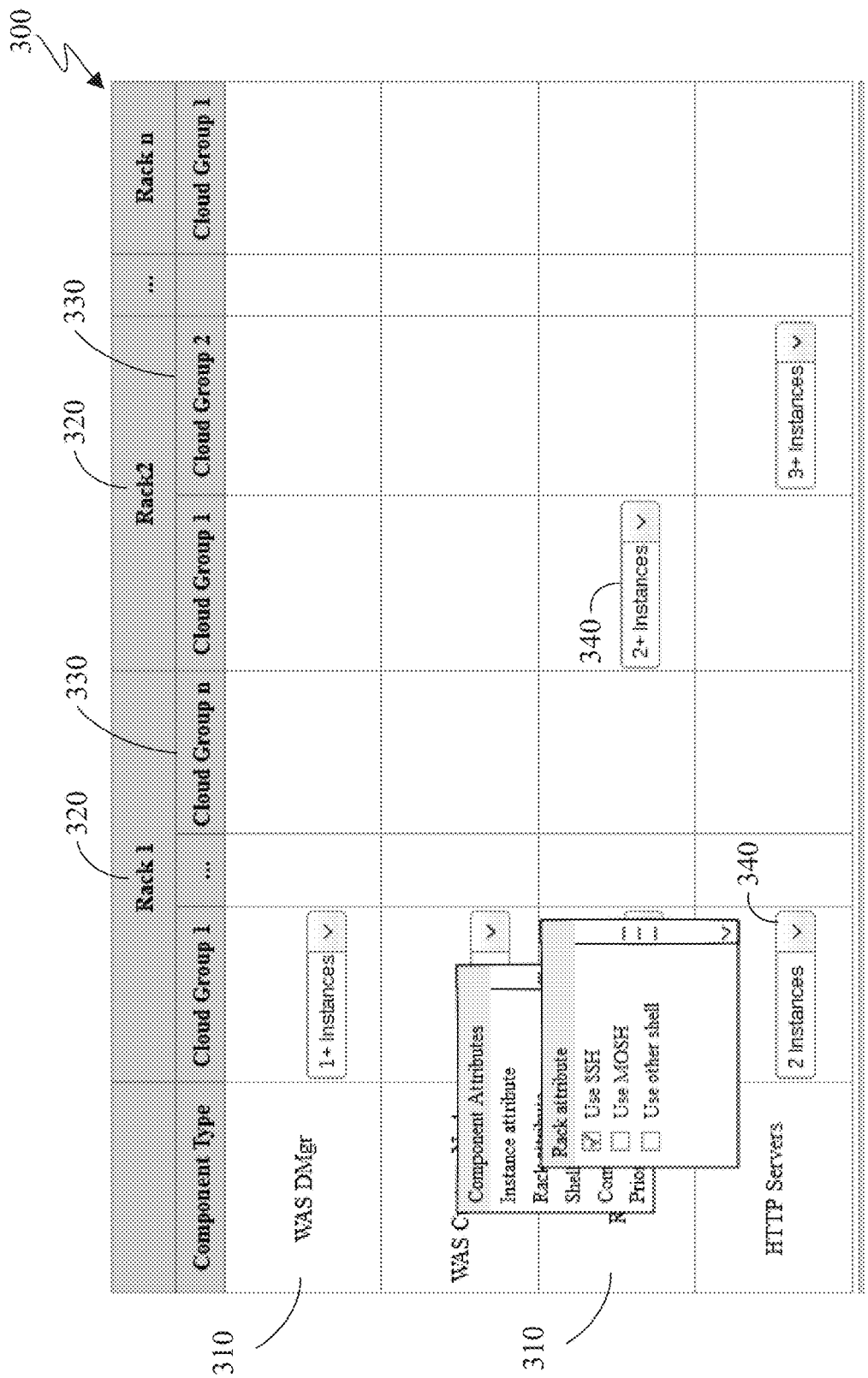
Figure 3D:
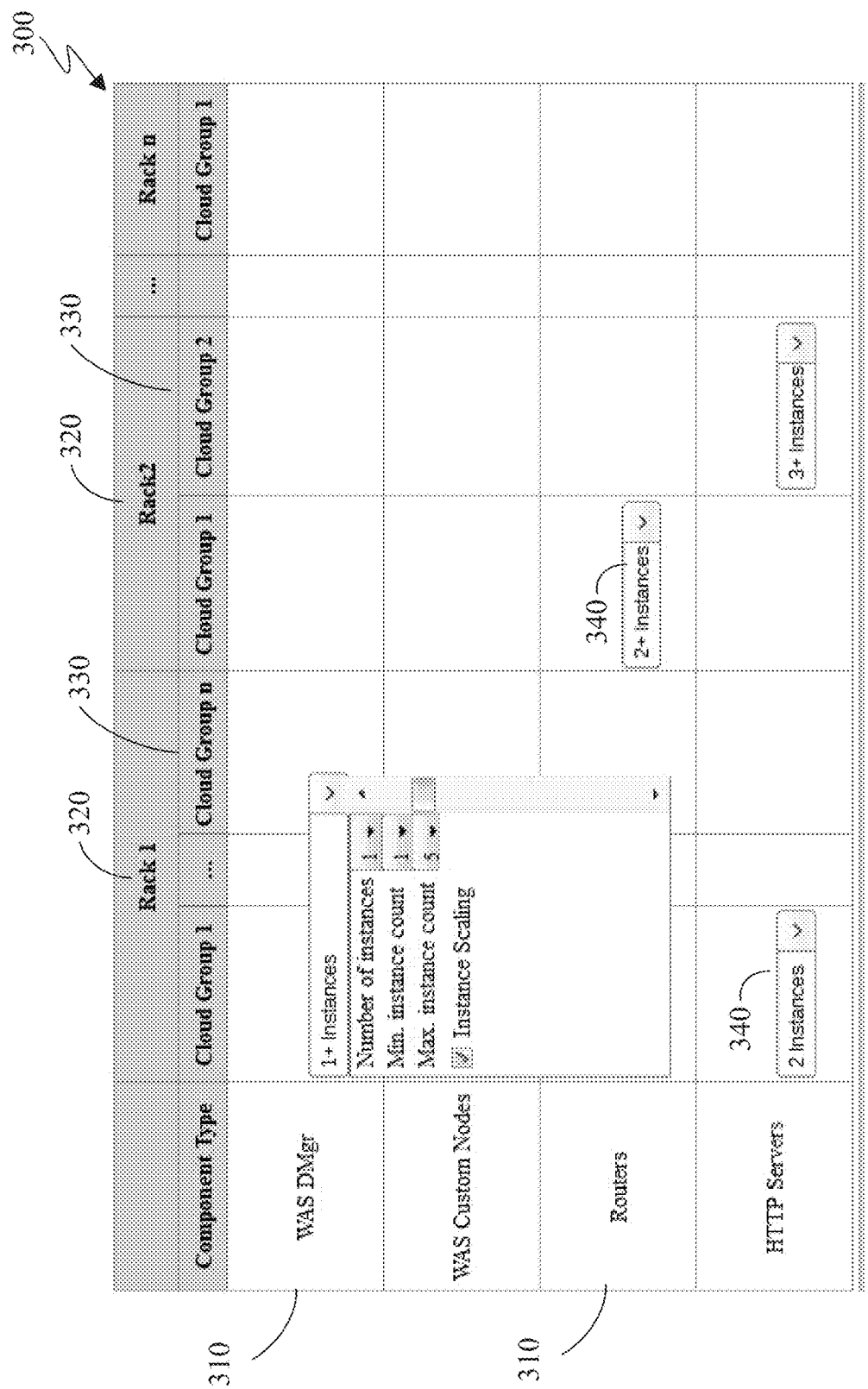

240. In this example, the component 310 "WAS Custom Nodes" is selected, revealing a list of component attributes 240 associated with this component 310. In FIG. 3C, a particular component attribute 240 is selected for specification by the user. In this example, SSH is selected as the shell attribute. FIG. 3D depicts how the depicted embodiment of the deployment design grid 300 may be used by a user to specify the instance attribute for a component 310. In this example, the minimum number of instances 340 is one, but the number of instance 340 count is configured to increment up to a maximum of five instances 350, as depicted by the checked box next to instance scaling.

Figure 4:
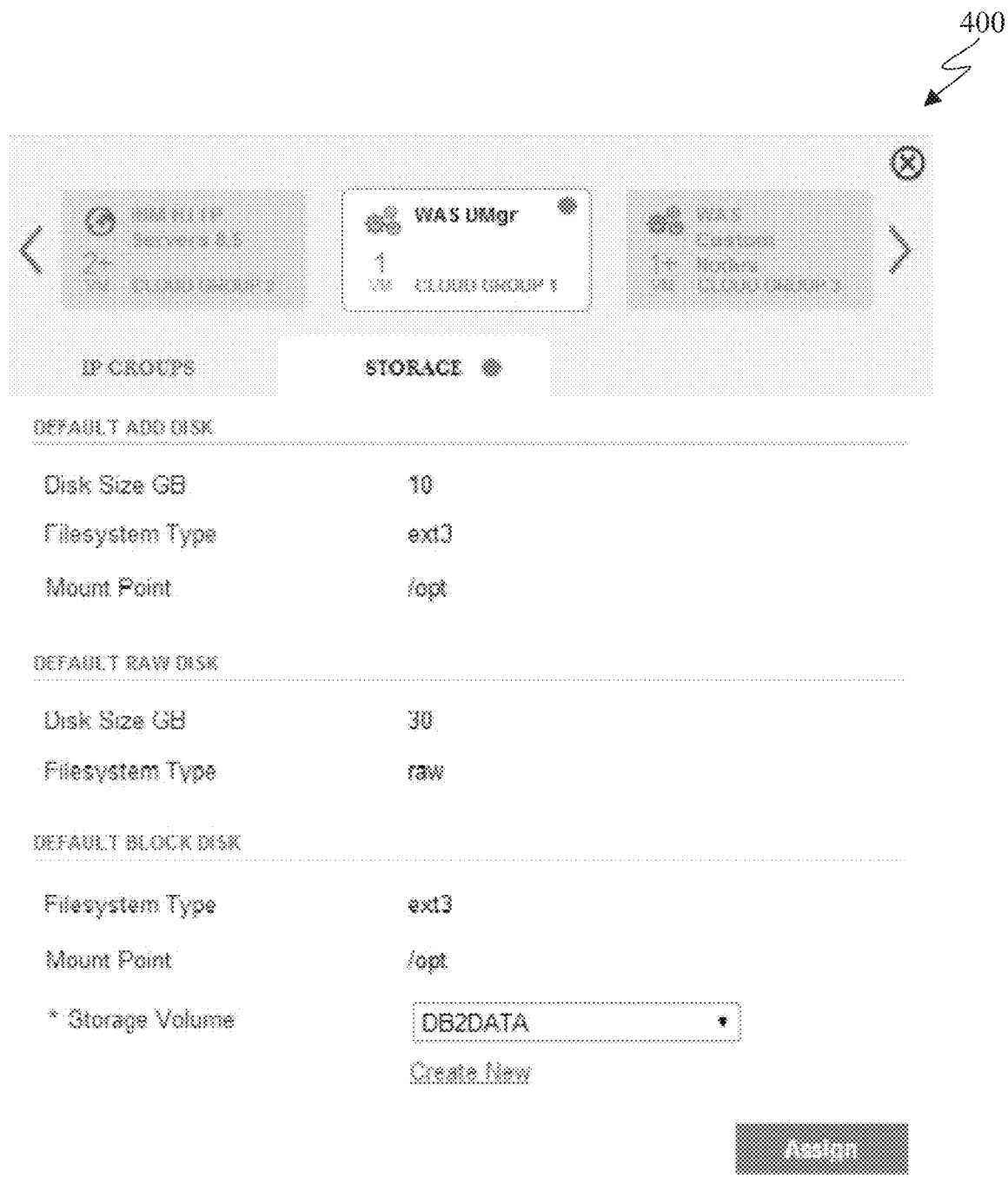
FIG. 4 is a user interface diagram depicting one example of a component attribute interface in accordance with the present invention.

FIG. 4 is a user interface diagram depicting one embodiment of a component attribute editor 400 in accordance with the present invention. In the depicted embodiment, the component attribute 240 that is being currently displayed in the component attribute editor 400 is a data storage attribute for a component called "WAS DMgr" belonging to Cloud Group 1. As indicated, there is one instance of WAS DMgr, and the lack of a plus sign adjacent to the numeral indicates that dynamic scaling is not enabled for this component. The component attributes 240 that are available for modification may depend on the location or cloud group in which the component 310 is placed. For example, if a component 310 is moved to a different location on the deployment design grid 300, the component 310 may receive a different set of network attributes (e.g. a different set of available IP address or IP groups) or storage attributes (e.g. different sets of volumes on which to mount).

In summary, multi-target deployment of virtual systems allows for a fully-managed on-site cloud computing system that is delivered pre-assembled and ready to deploy customer workloads. Management of the cloud system includes low level hardware (compute, storage, networking), hypervisors, virtualization managers (e.g. VMware® vCenter Server™, FlexSystem Manager), and patterns that deploy multiple orchestrated components. Patterns can be designed by users that contain multiple components which at deploy time will create multiple virtual machines. These deployable components may be further defined with customizations including script packages, additional networking and storage devices, and policies (e.g. scaling, anti-colocation), and the like.

A default intelligent recommendation may be shown to the user based on system utilization, and available of deployment artifacts needed for various virtual machine on each system and cloud group. Deployment components (e.g. virtual machines) can then be dragged and dropped across multiple cloud groups (collections of computer servers) on various systems in the deployment domain (systems that are linked together for deployment) to meet the user's customized location needs. Further customizations can then be made including networking (e.g. IP addresses), storage (add-on disks and volumes), and other deployment time information or parameters.

Figure 5:
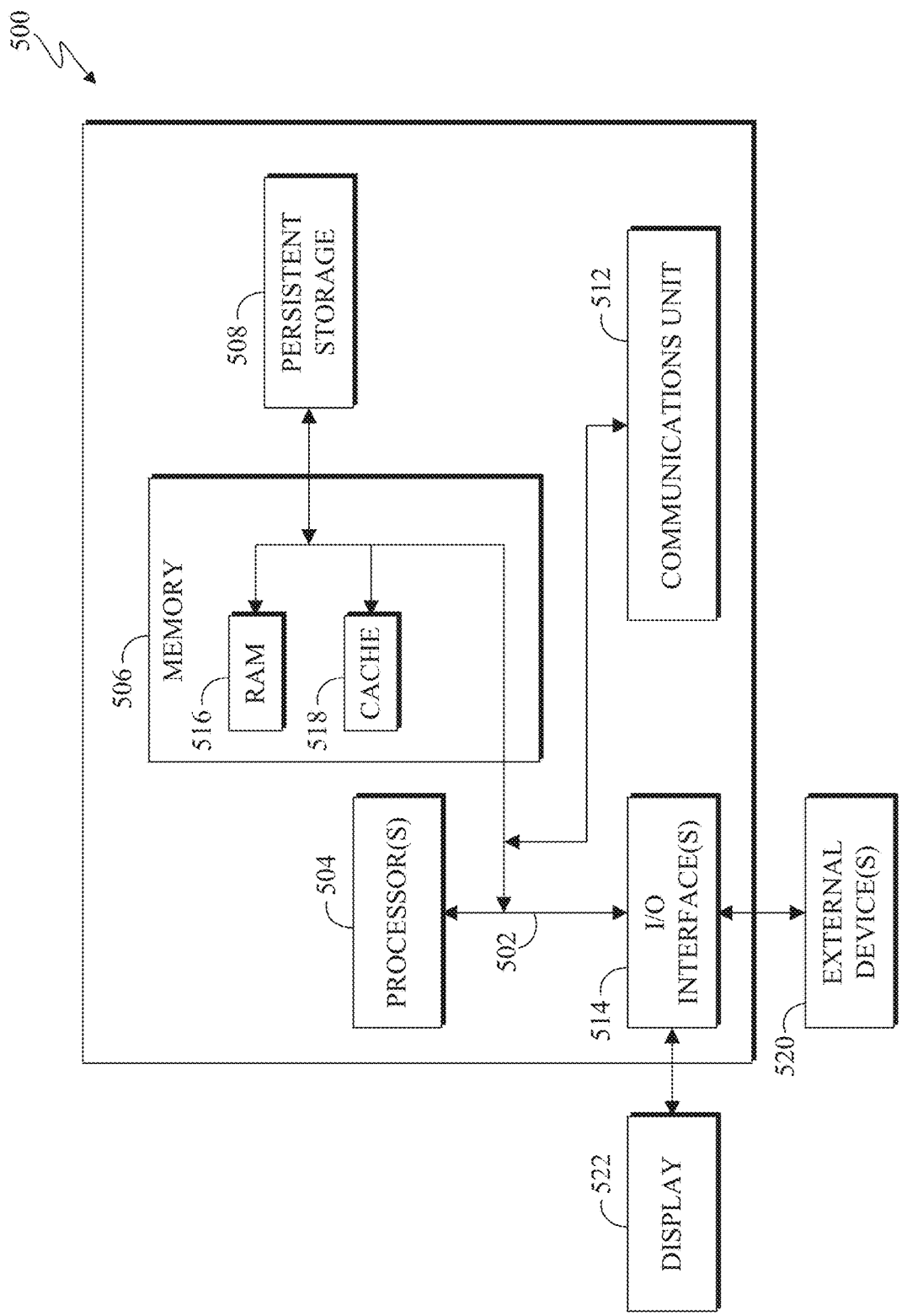
FIG. 5 is a block diagram depicting one example of a computing apparatus (i.e., computer) suitable for executing the methods disclosed herein.

The foregoing methods enable multi-target deployment of virtual systems. FIG. 5 is a block diagram depicting components of a computer 500 suitable for executing the methods disclosed herein. The computer 500 may be one embodiment of the deployment apparatus 200 depicted in FIG. 2. It should be appreciated that FIG. 5 provides only an illustration of one embodiment and does not imply any limitations with regard to the environments in which different embodiments may be implemented. Many modifications to the depicted environment may be made.

As depicted, the computer 500 includes communications fabric 502, which provides communications between computer processor(s) 504, memory 506, persistent storage 508, communications unit 512, and input/output (I/O) interface(s) 514. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are computer readable storage media. In the depicted embodiment, memory 506 includes random access memory (RAM) 516 and cache memory 518. In general, memory 506 can include any suitable volatile or non-volatile computer readable storage media.

One or more programs may be stored in persistent storage 508 for execution by one or more of the respective computer processors 504 via one or more memories of memory 506. The persistent storage 508 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer readable storage medium that is also part of persistent storage 508.

Communications unit 512, in these examples, provides for communications with other data processing systems or devices. In these examples, communications unit 512 includes one or more network interface cards. Communications unit 512 may provide communications through the use of either or both physical and wireless communications links.

I/O interface(s) 514 allows for input and output of data with other devices that may be connected to computer 500. For example, I/O interface 514 may provide a connection to external devices 520 such as a keyboard, keypad, a touch screen, and/or some other suitable input device. External devices 520 can also include portable computer readable storage media such as, for example, thumb drives, portable optical or magnetic disks, and memory cards.

Software and data used to practice embodiments of the present invention can be stored on such portable computer readable storage media and can be loaded onto persistent storage 508 via I/O interface(s) 514. I/O interface(s) 514 may also connect to a display 522. Display 522 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The embodiments disclosed herein include a system, a method, and/or a computer program product. The computer program product may include a computer readable storage medium (or media) having computer readable program instructions thereon for causing a processor to carry out the methods disclosed herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method, executed by a computer, for creating and deploying virtual environments, the method comprising:
    receiving, from a user via a user interface, requirements for creating component patterns containing a plurality of components that execute in virtual environments across at least two computing systems, wherein the user specifies particular settings for the component patterns using the user interface, wherein the user interface enables the user to select, modify, and move the components using a drag-and-drop operation of the user interface, wherein the received requirements specify one or more component attributes corresponding to the plurality of components, wherein the component attributes specify component behavior, wherein the component attributes include a range of instances the components can increment and decrement as a result of a predefined condition, and wherein the component patterns include anti-collocation rules;

determining component patterns corresponding to the received requirements, wherein the component patterns comprise the plurality of components and the corresponding component attributes on the at least two computing systems, and wherein the component patterns enable the components of the plurality of components to perform within available system resources, based on information on current availability and allocation of system resources;

determining a distribution for the plurality of components, wherein a first component deployed on a first virtual environment of a first computing system of the at least two computing systems references a second component deployed on a second virtual environment of a second computing system of the at least two computing systems;

automatically presenting the component patterns on a deployment design grid of the user interface based on the determinations, wherein the deployment design grid provides a visual representation of the component patterns and available computing resources of the first and the second computing systems;

enabling the user to edit the component patterns using the deployment design grid, wherein editing the component patterns comprises modifying the placement of the components and the associated attributes of the first and the second computing systems by selecting and using the drag-and-drop operation of the user interface, wherein the deployment design grid enables the user to configure dynamic scaling for each component by defining a minimum instance count and a maximum instance count for each component, and wherein the dynamic scaling is enabled via a checkbox;

responsive to the user editing the component patterns using the deployment design grid, reserving system resources as the user edits the component patterns on the deployment design grid, wherein the system resources are immediately available to the plurality of components at runtime for both the first and the second computing systems;

saving the edited component patterns as a virtual system corresponding to the component patterns; and for each of the first and the second computing systems:
deploying and executing the virtual system corresponding to the component patterns, wherein the virtual system dynamically detects within the range of instances of each component of the plurality of components, how many components are scaled as the result of the predefined condition and anti-colocation rules; and dynamically scaling the number of instances of each component during runtime, based on the predefined conditions and events in configuration data for the virtual system, wherein the number of instances is dynamically incremented and decremented between the minimum instance count and the maximum instance count.

2. The method of claim 1, wherein the component attributes include an instance attribute, a rack attribute, a shell attribute, a communication protocol attribute, a schedule attribute, a priority attribute, a virtual machine distribution attribute, a network group attribute, a network address attribute, and a data storage attribute.

3. The method of claim 1, wherein enabling the user to edit the component pattern further comprises determining valid component patterns and presenting valid component patterns to the user.

4. The method of claim 1, wherein the dynamic scaling occurs in response to the predefined conditions and events occurring during a deployment operation at runtime.

5. The method of claim 4, wherein the predefined conditions and events are configured by a user and stored in instance attributes.

6. The method of claim 5, wherein the instance attributes define a range of a particular number of instances of a component that may increment or decrement upon the occurrence or nonoccurrence of the predefined conditions and events.

7. The method of claim 4, wherein the predefined conditions and events include system utilization.

8. The method of claim 1, wherein the user interface further enables the user to define components to include customized script packages, additional networking and storage devices, and policies, and wherein the policies include scaling rules and the anti-colocation rules.

9. A computer system for creating and deploying virtual environments, the computer system comprising:
one or more computer processors;
one or more computer readable storage media;
program instructions stored therein for execution by at least one of the one or more computer processors, the program instructions comprising instructions to:

receive, from a user via the user interface, requirements for creating component patterns containing a plurality of components that execute in virtual environments across at least two computing systems, wherein the user specifies particular settings for the component patterns using a user interface, wherein the user interface enables the user to select, modify, and move the components using a drag-and-drop operation of the user interface, wherein the received requirements specify one or more component attributes corresponding to the plurality of components, wherein the component attributes specify component behavior, wherein the component attributes include a range of instances the components can increment and decrement as a result of a predefined condition, and wherein the component patterns include anti-collocation rules;

determine component patterns corresponding to the received requirements, wherein the component patterns comprise the plurality of components and the corresponding component attributes on the at least two computing systems, and wherein the component patterns enable the components of the plurality of components to perform within available system resources, based on information on current availability and allocation of system resources;

determine a distribution for the plurality of components, wherein a first component deployed on a first virtual environment of a first computing system of the at least two computing systems references a second component deployed on a second virtual environment of a second computing system of the at least two computing systems;

automatically present the component patterns on a deployment design grid of the user interface based on the determinations, wherein the deployment design grid provides a visual representation of the component patterns and available computing resources of the first and the second computing systems;

enable the user to edit the component patterns using the deployment design grid, wherein editing the component patterns comprises modifying the placement of the components and the associated attributes of the first and the second computing systems by selecting and using the drag-and-drop operation of the user interface, wherein the deployment design grid enables the user to configure dynamic scaling for each component by defining a minimum instance count and a maximum instance count for each component, and wherein the dynamic scaling is enabled via a checkbox;

responsive to the user editing the component patterns using the deployment design grid, reserve system resources as the user edits the component patterns on the deployment design grid, wherein the system resources are immediately available to the plurality of components at runtime for both the first and the second computing systems;

save the edited component patterns as a virtual system corresponding to the component patterns; and for each of the first and the second computing systems:
deploy and execute the virtual system corresponding to the component patterns, wherein the virtual system dynamically detects within the range of instances of each component of the plurality of components, how many components are scaled as the result of the predefined condition and anti-colocation rules; and
dynamically scale the number of instances of each component during runtime, based on the predefined conditions and events in configuration data for the virtual system, wherein the number of instances is dynamically incremented and decremented between the minimum instance count and the maximum instance count.

10. The computer system of claim 9, wherein the component attributes include an instance attribute, a rack attribute, a shell attribute, a communication protocol attribute, a schedule attribute, a priority attribute, a virtual machine distribution attribute, a network group attribute, a network address attribute, and a data storage attribute.

11. The computer system of claim 9, wherein the instructions to enable the user to edit the component pattern further comprise instructions to determine valid component patterns and present valid component patterns to the user.

12. The computer system of claim 9, wherein the dynamic scaling occurs in response to the predefined conditions and events occurring during a deployment operation at runtime.

13. The computer system of claim 12, wherein the predefined conditions and events are configured by a user and stored in instance attributes.

14. The computer system of claim 9, wherein the user interface further enables the user to define components to include customized script packages, additional networking and storage devices, and policies, and wherein the policies include scaling rules and the anti-colocation rules.

15. A computer program product for creating and deploying virtual environments, the computer program product comprising:
a computer readable storage medium and program instructions stored on the computer readable storage medium, the program instructions comprising instructions to:
receive, from a user via the user interface, requirements for creating component patterns containing a plurality of components that execute in virtual environments across at least two computing systems, wherein the user specifies particular settings for the component patterns using a user interface, wherein the user interface enables the user to select, modify, and move the components using a drag-and-drop operation of the user interface, wherein the received requirements specify one or more component attributes corresponding to the plurality of components, wherein the component attributes specify component behavior, wherein the component attributes include a range of instances the components can increment and decrement as a result of a predefined condition, and wherein the component patterns include anti-colocation rules;

determine component patterns corresponding to the received requirements, wherein the component patterns comprise the plurality of components and the corresponding component attributes on the at least two computing systems, and wherein the component patterns enable the components of the plurality of components to perform within available system resources, based on information on current availability and allocation of system resources;

determine a distribution for the plurality of components, wherein a first component deployed on a first virtual environment of a first computing system of the at least two computing systems references a second component deployed on a second virtual environment of a second computing system of the at least two computing systems;

automatically present the component patterns on a deployment design grid of the user interface based on the determinations, wherein the deployment design grid provides a visual representation of the component patterns and available computing resources of the first and the second computing systems;

enable the user to edit the component patterns using the deployment design grid, wherein editing the component patterns comprises modifying the placement of the components and the associated attributes of the first and the second computing systems by selecting and using the drag-and-drop operation of the user interface, wherein the deployment design grid enables the user to configure dynamic scaling for each component by defining a minimum instance count and a maximum instance count for each component, and wherein the dynamic scaling is enabled via a checkbox;

responsive to the user editing the component patterns using the deployment design grid, reserve system resources as the user edits the component patterns on the deployment design grid, wherein the system resources are immediately available to the plurality of components at runtime for both the first and the second computing systems;

save the edited component patterns as a virtual system corresponding to the component patterns; and for each of the first and the second computing systems:
deploy and execute the virtual system corresponding to the component patterns, wherein the virtual system dynamically detects within the range of instances of each component of the plurality of components, how many components are scaled as the result of the predefined condition and anti-colocation rules; and
dynamically scale the number of instances of each component during runtime, based on the predefined conditions and events in configuration data for the virtual system, wherein the number of instances is dynamically incremented and decremented between the minimum instance count and the maximum instance count.

16. The computer program product of claim 15, wherein the component attributes include an instance attribute, a rack attribute, a shell attribute, a communication protocol attribute, a schedule attribute, a priority attribute, a virtual machine distribution attribute, a network group attribute, a network address attribute, and a data storage attribute.

17. The computer program product of claim 15, wherein the instructions to enable the user to edit the component pattern further comprise instructions to determine valid component patterns and present valid component patterns to the user.

18. The computer program product of claim 15, wherein the user interface further enables the user to define components to include customized script packages, additional networking and storage devices, and policies, and wherein the policies include scaling rules and the anti-colocation rules.

* * * * *